(12) United States Patent
Guney et al.

(10) Patent No.: US 11,935,417 B2
(45) Date of Patent: Mar. 19, 2024

(54) SYSTEMS AND METHODS FOR COOPERATIVELY MANAGING MIXED TRAFFIC AT AN INTERSECTION

(71) Applicant: Toyota Motor Engineering & Manufacturing North America, Inc., Plano, TX (US)

(72) Inventors: Mehmet Ali Guney, Mountain View, CA (US); Rui Guo, San Jose, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 106 days.

(21) Appl. No.: 17/229,203

(22) Filed: Apr. 13, 2021

(65) Prior Publication Data
US 2022/0327935 A1    Oct. 13, 2022

(51) Int. Cl.
*G08G 1/00* (2006.01)
*G08G 1/16* (2006.01)
*G05D 1/02* (2020.01)

(52) U.S. Cl.
CPC ............ *G08G 1/22* (2013.01); *G05D 1/0231* (2013.01); *G05D 1/0255* (2013.01);
(Continued)

(58) Field of Classification Search
None
See application file for complete search history.

(56) References Cited

U.S. PATENT DOCUMENTS

| | | | |
|---|---|---|---|
| 7,647,180 B2 | 1/2010 | Breed |
| 7,663,505 B2 | 2/2010 | Publicover |
| | (Continued) | | |

FOREIGN PATENT DOCUMENTS

CN        108831143        * 11/2018

OTHER PUBLICATIONS

Weiming Zhao and et al., "A platoon based cooperative eco-driving model for mixed automated and human-driven vehicles at a signalised intersection", Oct. 2018, Transportation Research Part C: Emerging Technologies, vol. 95, pp. 802-821 (Year: 2018).*
(Continued)

*Primary Examiner* — Hongye Liang
(74) *Attorney, Agent, or Firm* — Christopher G. Darrow; Darrow Mustafa PC (57) ABSTRACT

Systems and methods for cooperatively managing mixed traffic at an intersection are disclosed herein. One embodiment determines, at an autonomous sensor-rich vehicle, that one or more other vehicles are following in the same lane, the one or more other vehicles including at least one legacy vehicle; communicates with the one or more other vehicles to form a platoon; receives Signal Phase and Timing (SpaT) information from a roadside unit associated with an intersection toward which the platoon is traveling; calculates at the autonomous sensor-rich vehicle, based at least in part on the SPaT information and location information for the platoon, a speed profile and a trajectory for the autonomous sensor-rich vehicle that minimize a delay of the platoon in traversing the intersection while accounting for fuel consumption; and executes the speed profile and the trajectory to control indirectly the one or more other vehicles while the platoon traverses the intersection.

17 Claims, 5 Drawing Sheets

(52) U.S. Cl.
CPC ......... *G05D 1/0257* (2013.01); *G05D 1/0276* (2013.01); *G05D 1/0295* (2013.01); *G08G 1/162* (2013.01)

(56) References Cited

U.S. PATENT DOCUMENTS

| | | | |
|---|---|---|---|
| 8,744,666 | B2 | 6/2014 | Switkes et al. |
| 8,825,350 | B1 | 9/2014 | Robinson |
| 9,020,660 | B2 | 4/2015 | Mudalige et al. |
| 9,412,271 | B2 | 8/2016 | Sharma |
| 9,830,813 | B2 | 11/2017 | Smith et al. |
| 9,940,840 | B1 | 4/2018 | Schubert et al. |
| 9,978,270 | B2 | 5/2018 | Raamot |
| 10,083,607 | B2 | 9/2018 | Ginsberg et al. |
| 10,657,821 | B2 | 5/2020 | Garrett et al. |
| 10,692,365 | B2 | 6/2020 | Ran et al. |
| 10,706,461 | B2 | 7/2020 | Varma et al. |
| 2020/0207343 | A1* | 7/2020 | Vassilovski ............ G08G 1/164 |
| 2022/0375343 | A1* | 11/2022 | Lund ...................... H04W 4/023 |

OTHER PUBLICATIONS

Sakr, "Cooperative Road Geometry Estimation via Sharing Processed Camera Data," 2020 IEEE 3rd Connected and Automated Vehicles Symposium (CAVS), abstract linked at https://ieeexplore.ieee.org/abstract/document/9334579.

Wang et al., "Cooperative Eco-Driving at Signalized intersections in a Partially Connected and Automated Vehicle Environment," IEEE Transactions on Intelligent Transportation Systems, vol. 21, No. 5, May 2020, available at https://escholarship.org/content/qt6gp0038p/qt6gp0038p.pdf.

Qian et al., "Priority-Based Coordination of Autonomous and Legacy Vehicles at Intersection," 2014, found at http://citeseerx.ist.psu.edu/viewdoc/download?doi=10.1.1.681.7847&rep=rep1&type=pdf.

Qian et al., "Autonomous Intersection Management for Mixed Traffic Flow," arXiv:1407.5813v10 Jul. 22, 2014, found at https://www.researchgate.net/profile/Jean-Gregoire/publication/264160804_Prioritybased_coordination_of_autonomous_and_legacy_vehicles_at_intersection/links/53d782a30cf29265323cca48/Priority-based-coordination-of-autonomous-and-legacy-vehicles-at-interseciton.pdf.

Rhoades, "A Novel Framework for Integrating Legacy Vehilces into an Intelligent Transportation System," dissertation submitted to UNC at Charlotte, 2018, found at https://search.proquest.com/openview/8440238f72fe9e9d5460f4ee7e27adad/1?pq-origsite=gscholar&cvl=18750&diss=y.

* cited by examiner

SYSTEMS AND METHODS FOR COOPERATIVELY MANAGING MIXED TRAFFIC AT AN INTERSECTION

TECHNICAL FIELD

The subject matter described herein generally relates to vehicles and, more particularly, to systems and methods for cooperatively managing mixed traffic at an intersection.

BACKGROUND

Though intersections constitute a relatively small part of the roadway network, they are where a substantial portion of the accidents and congestion occur. A significant amount of effort has been devoted in the transportation and automotive industries to automate the navigation of intersections by connected (communication-capable) autonomous vehicles. However, for the near future, it is unrealistic to expect that all the vehicles traveling on roadways will be autonomous. Instead, there will be a transition period of a number of years during which the traffic will be a mixture of autonomous sensor-rich vehicles and legacy vehicles. Managing intersections with mixed traffic poses some challenges due to the different capabilities of the sensor-rich and legacy vehicles.

SUMMARY

An example of a system for cooperatively managing mixed traffic at an intersection is presented herein. The system comprises one or more processors in an autonomous sensor-rich vehicle and a memory in the autonomous sensor-rich vehicle communicably coupled to the one or more processors. The memory stores a platoon formation module including instructions that when executed by the one or more processors cause the one or more processors to determine that one or more other vehicles are behind the autonomous sensor-rich vehicle in a same lane of traffic as the autonomous sensor-rich vehicle, the one or more other vehicles including at least one legacy vehicle. The platoon formation module also includes instructions that when executed by the one or more processors cause the one or more processors to communicate vehicle to vehicle from the autonomous sensor-rich vehicle with the one or more other vehicles to form a platoon that includes the autonomous sensor-rich vehicle and the one or more other vehicles. The memory also stores an infrastructure communication module including instructions that when executed by the one or more processors cause the one or more processors to receive Signal Phase and Timing (SPaT) information from a roadside unit associated with an intersection toward which the platoon is traveling. The memory also stores a maneuver-planning module including instructions that when executed by the one or more processors cause the one or more processors to calculate, based at least in part on the SPaT information and location information for the platoon, a speed profile and a trajectory for the autonomous sensor-rich vehicle that minimize a delay of the platoon in traversing the intersection while also taking into account fuel consumption by the platoon. The maneuver-planning module also includes instructions that when executed by the one or more processors cause the one or more processors to execute the speed profile and the trajectory to control indirectly the one or more other vehicles while the platoon is traversing the intersection.

Another embodiment is a non-transitory computer-readable medium for cooperatively managing mixed traffic at an intersection and storing instructions that when executed by one or more processors cause the one or more processors to determine, at an autonomous sensor-rich vehicle, that one or more other vehicles are behind the autonomous sensor-rich vehicle in a same lane of traffic as the autonomous sensor-rich vehicle, the one or more other vehicles including at least one legacy vehicle. The instructions also cause the one or more processors to communicate vehicle to vehicle from the autonomous sensor-rich vehicle with the one or more other vehicles to form a platoon that includes the autonomous sensor-rich vehicle and the one or more other vehicles. The instructions also cause the one or more processors to receive, at the autonomous sensor-rich vehicle, Signal Phase and Timing (SpaT) information from a roadside unit associated with an intersection toward which the platoon is traveling. The instructions also cause the one or more processors to calculate at the autonomous sensor-rich vehicle, based at least in part on the SPaT information and location information for the platoon, a speed profile and a trajectory for the autonomous sensor-rich vehicle that minimize a delay of the platoon in traversing the intersection while also taking into account fuel consumption by the platoon. The instructions also cause the one or more processors to execute the speed profile and the trajectory to control indirectly the one or more other vehicles while the platoon is traversing the intersection.

Another embodiment is a method of cooperatively managing mixed traffic at an intersection. The method includes determining, at an autonomous sensor-rich vehicle, that one or more other vehicles are behind the autonomous sensor-rich vehicle in a same lane of traffic as the autonomous sensor-rich vehicle, the one or more other vehicles including at least one legacy vehicle. The method also includes communicating vehicle to vehicle from the autonomous sensor-rich vehicle with the one or more other vehicles to form a platoon that includes the autonomous sensor-rich vehicle and the one or more other vehicles. The method also includes receiving, at the autonomous sensor-rich vehicle, Signal Phase and Timing (SpaT) information from a roadside unit associated with an intersection toward which the platoon is traveling. The method also includes calculating at the autonomous sensor-rich vehicle, based at least in part on the SPaT information and location information for the platoon, a speed profile and a trajectory for the autonomous sensor-rich vehicle that minimize a delay of the platoon in traversing the intersection while also taking into account fuel consumption by the platoon. The method also includes executing the speed profile and the trajectory to control indirectly the one or more other vehicles while the platoon is traversing the intersection.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments of an intersection management system described herein leverage the sensor, communication, and computing capabilities of sensor-rich vehicles to assist legacy vehicles in traversing intersections. In various embodiments, it is assumed that the sensor-rich vehicles are capable of autonomous driving at Level 2 or higher in the Society of Automotive Engineers (SAE) autonomy nomenclature. In this description, such a vehicle is referred to as an "autonomous sensor-rich vehicle," "an autonomous SRV," or, simply, a "sensor-rich vehicle" or "SRV." An autonomous SRV includes various environment sensors such as cameras, Light Detection and Ranging (LIDAR) sensors, radar sensors, and sonar sensors to support autonomous driving. It is also assumed that a legacy vehicle (LV) lacks such environment sensors but includes vehicle-to-vehicle (V2V) communication capability (e.g., through the addition of an after-market V2V communication transceiver). In some embodiments, the LVs also include a Global Positioning System (GPS) unit or subsystem for ascertaining the LV's location, at least approximately.

In various embodiments, an autonomous SRV includes an onboard intersection management system that forms a platoon with one or more identified vehicles, including at least one LV, that are following the autonomous SRV in the same lane of traffic. As the vehicles are approaching an intersection, the autonomous SRV receives Signal Phase and Timing (SPaT) information from a roadside unit associated with the intersection. Based on the SPaT information and a knowledge of the respective locations of the vehicles in the platoon, the onboard intersection management system can calculate a speed profile and a trajectory for the autonomous SRV that minimize the delay the platoon incurs in traversing the intersection while simultaneously taking into account fuel consumption by the vehicles in the platoon. The autonomous SRV can then execute the calculated speed profile and trajectory to control indirectly the other vehicles in the platoon while the platoon is traversing the intersection. The autonomous SRV thus acts as the leader (the "lead autonomous SRV") of a platoon that can include both LVs and other autonomous SRVs.

Another aspect of the various embodiments is the sharing of information among autonomous SRVs that are near one another, whether they are in the same or different platoons. For example, the autonomous SRVs can share information with one another regarding the detected locations of LVs that could potentially become part of a yet-to-be-formed platoon or that are part of an already-formed platoon. In some embodiments, if there are multiple autonomous SRVs in the same platoon, those autonomous SRVs can share the computational burden of calculating the optimum speed profile and trajectory of the lead autonomous SRV. This is an example of distributed computing. In some embodiments, two autonomous SRVs in the same platoon can negotiate splitting the platoon into two separate platoons, one led by one autonomous SRV and another led by the other autonomous SRV, where doing so furthers the objectives of minimizing delay in traversing the intersection while also taking into account fuel efficiency.

Figure 1:
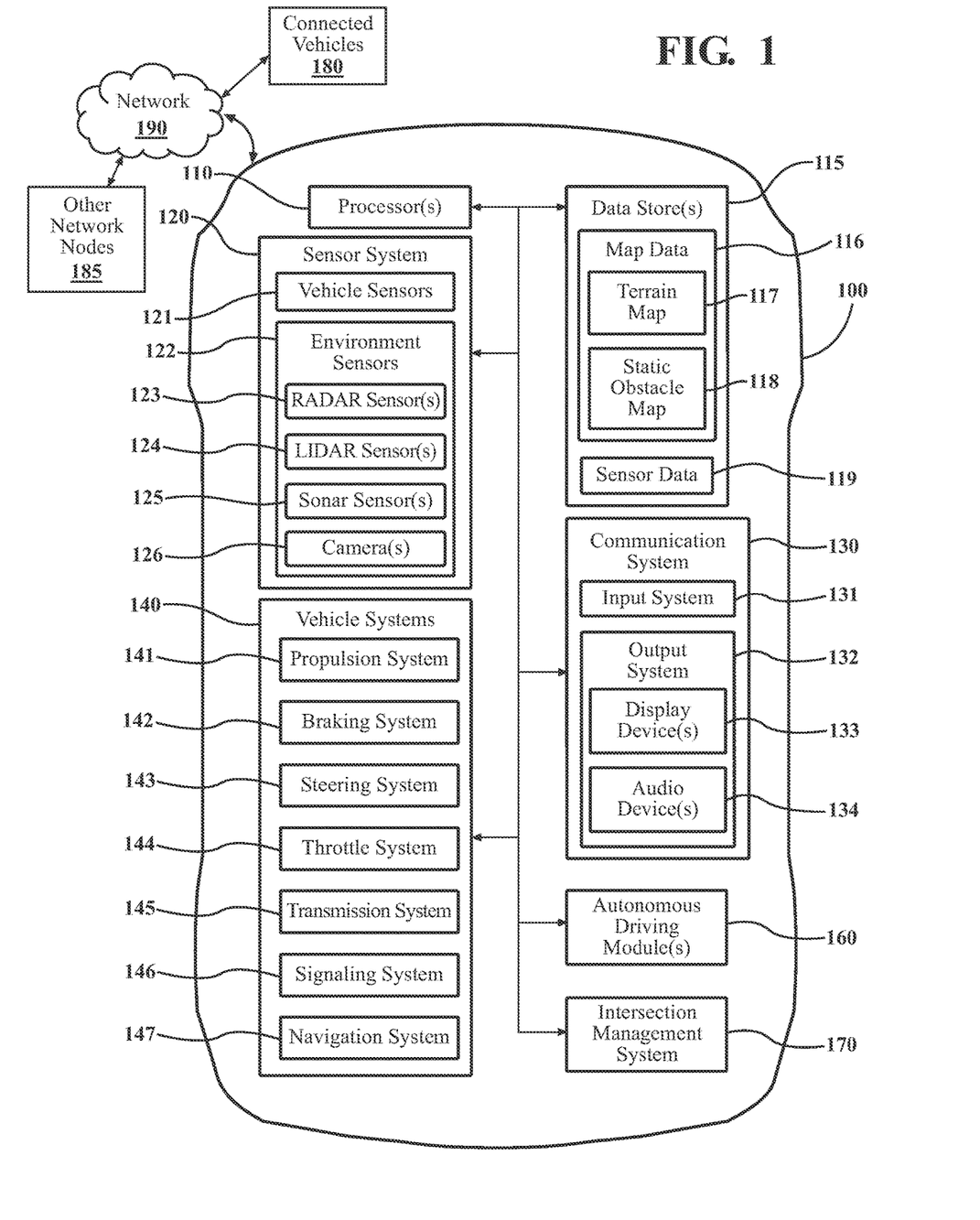
FIG. 1 illustrates one embodiment of an autonomous sensor-rich vehicle within which systems and methods disclosed herein may be implemented.

Referring to FIG. 1, an example of an autonomous SRV 100 (hereinafter, "SRV 100"), in which systems and methods disclosed herein can be implemented, is illustrated. The SRV 100 can include an intersection management system 170 or components and/or modules thereof. As used herein, a "vehicle" is any form of motorized transport. In one or more implementations, the SRV 100 can be an automobile. In other implementations, the SRV 100 may be any other form of motorized transport. The SRV 100 can include the intersection management system 170 or capabilities to support or interact with the intersection management system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of SRV 100, as used herein, are equally applicable to any device capable of incorporating the systems or methods described herein.

The SRV 100 also includes various elements. It will be understood that, in various implementations, it may not be necessary for the SRV 100 to have all of the elements shown in FIG. 1. The SRV 100 can have any combination of the various elements shown in FIG. 1. Further, the SRV 100 can have additional elements to those shown in FIG. 1. In some arrangements, the SRV 100 may be implemented without one or more of the elements shown in FIG. 1, including intersection management system 170. While the various elements are shown as being located within the SRV 100 in FIG. 1, it will be understood that one or more of these elements can be located external to the SRV 100 or be part of a system that is separate from SRV 100. Further, the elements shown may be physically separated by large distances.

As discussed above, SRV 100 includes environment sensors such as cameras 126, LIDAR sensors 124, radar sensors 123, and sonar sensors 125 to support autonomous driving at SAE Level 2 to 5, depending on the embodiment. To control and direct autonomous driving, SRV 100 includes autonomous driving module(s) 160 that operate in conjunction with various vehicle systems 140. As shown in FIG. 1, SRV 100 may communicate with other connected vehicles 180 via a network 190. Those other vehicles may include other autonomous SRVs similar to SRV 100 and LVs. As discussed above, a "legacy vehicle" or "LV" is a vehicle that lacks environment sensors such as cameras, LIDAR sensors, radar sensors, and sonar sensors. In some embodiments, a LV includes a Global Positioning System (GPS) unit or subsystem for ascertaining the LV's location, at least approximately. Also, an LV includes V2V communication capability but, in some embodiments, might not include vehicle-to-infrastructure (V2I) communication capability. In contrast, an autonomous SRV such as SRV 100 includes V2I communication capability for communicating with other network nodes 185 such as roadside units (RSUs) associated with traffic signals at intersections, cloud servers (e.g., traffic-information servers), and edge servers.

In FIG. 1, network 190 represents any of a variety of wired and wireless networks. For example, in communicating directly with another vehicle (V2V communication), SRV 100 can employ a technology such as dedicated short-range communication (DSRC) or Bluetooth Low Energy (BLE). In various embodiments, SRV 100 communicates with other SRVs and LVs via V2V communication. In communicating with infrastructure, SRV 100 can use a technology such as DSRC (e.g., to communicate with RSUs). To communicate with remote servers, SRV 100 can employ a technology such as cellular data (e.g., LTE or 5G). In some embodiments, network 190 includes the Internet.

Some of the possible elements of the SRV 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
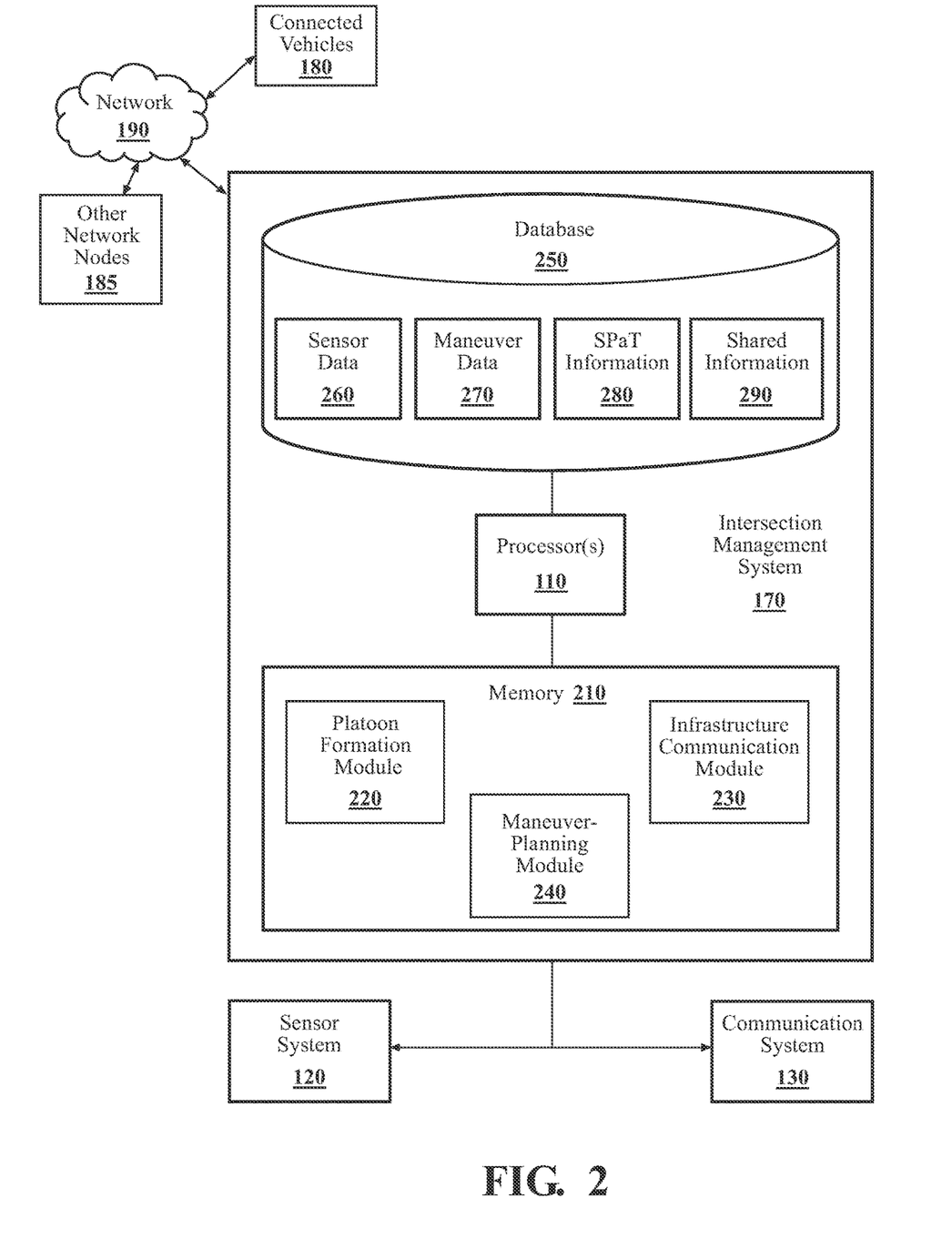
FIG. 2 illustrates one embodiment of an intersection management system.

Referring to FIG. 2, the intersection management system 170 is shown as including one or more processors 110 from the SRV 100 of FIG. 1. Accordingly, the one or more processors 110 may be a part of the intersection management system 170, the intersection management system 170 may include one or more separate processors from the one or more processors 110 of the SRV 100, or the intersection management system 170 may access the one or more processors 110 through a data bus or another communication path. In one embodiment, the intersection management system 170 includes a memory 210 that stores a platoon formation module 220, an infrastructure communication module 230, and a maneuver-planning module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the one or more processors 110, cause the one or more processors 110 to perform the various functions disclosed herein. In performing their various functions, the modules of intersection management system 170 make use of sensor data 260 from sensor system 120 and generate various kinds of maneuver data 270 (e.g., calculated speed profiles and trajectories). Intersection management system 170 also uses SPaT information 280 received from RSUs and shared information 290 obtained from other autonomous SRVs. These various kinds of data (260, 270, 280, and 290) and other data associated with intersection management system 170 can be stored in a database 250.

As shown in FIG. 2, intersection management system 170 can communicate with one or more connected vehicles 180 (other SRVs and LVs) and with other network nodes 185 (RSUs, servers, etc.) via network 190, as discussed above. In some embodiments, intersection management system 170 may interface with other systems or subsystems of SRV 100 such as sensor system 120 and communication system 130.

Referring once again to FIG. 2, platoon formation module 220 generally includes instructions that when executed by the one or more processors 110 cause the one or more processors 110 to determine that one or more other vehicles are behind the SRV 100 in the same lane of traffic as the SRV 100.

Platoon formation module 220 can determine that the one or more other vehicles are following SRV 100 in the same lane by employing one or more of several techniques. First, platoon formation module 220 can analyze sensor data 260 obtained from one or more of the environment sensors (e.g., a rear-facing camera 126) in sensor system 120 installed on SRV 100. In analyzing the sensor data 260, platoon formation module 220 can employ techniques such as object detection/recognition based on semantic and/or instance segmentation. Second, platoon formation module 220 can analyze shared information 290 received via V2V communications from one or more other nearby SRVs. Those other SRVs might be behind SRV 100 in the same lane, or they might be in a different lane (e.g., in a lane adjacent to one or more vehicles following SRV 100 in the same lane as SRV 100). The shared information 290 can include identification of vehicles near SRV 100 and their respective estimated locations or other information (speed, heading, etc.) that permits SRV 100 to localize those vehicles. From that information, SRV 100 can determine which, if any, of the vehicles about which it has received shared information are traveling behind SRV 100 in the same lane. Third, platoon formation module 220 can receive, from one or more nearby LVs, a V2V message (e.g., a periodically transmitted beacon message, in some embodiments) indicating the identity (e.g., vehicle type, make, model, model year, Vehicle Identification Number, etc.) and location of each of the one or more LVs. If platoon formation module 220 determines that a given LV from which a V2V message is received is following SRV 100 in the same lane as SRV 100, that LV can become a candidate for possible membership in a yet-to-be-formed platoon with SRV 100 as the lead vehicle. Platoon formation module 220 can employ one or more of the three techniques discussed above to identify one or more vehicles behind SRV 100 that are traveling in the same lane as SRV 100.

Platoon formation module 220 also includes instructions that when executed by the one or more processors 110 cause the one or more processors 110 to communicate V2V from SRV 100 with the one or more other vehicles to form a platoon (a group of cooperating vehicles) that includes SRV 100 (the lead autonomous SRV or platoon leader) and the one or more other (following) vehicles discussed above. In some embodiments, SRV 100 transmits a V2V message to the one or more other vehicles inviting them to participate in a platoon for the purpose of cooperatively traversing an intersection toward which the vehicles in the potential platoon are traveling. The one or more invited vehicles can respond to SRV 100 with a V2V message confirming their acceptance of the invitation to be part of the proposed ad hoc platoon. Since the embodiments described herein concern mixed-traffic situations, the one or more other vehicles joining the platoon include at least one LV. In general, a platoon may also include one or more other autonomous SRVs besides the lead autonomous SRV 100. In a boundary case, SRV 100 may be a platoon of a single vehicle by itself. Platoons and platoon formation are discussed further in connection with FIG. 3.

Figure 3:
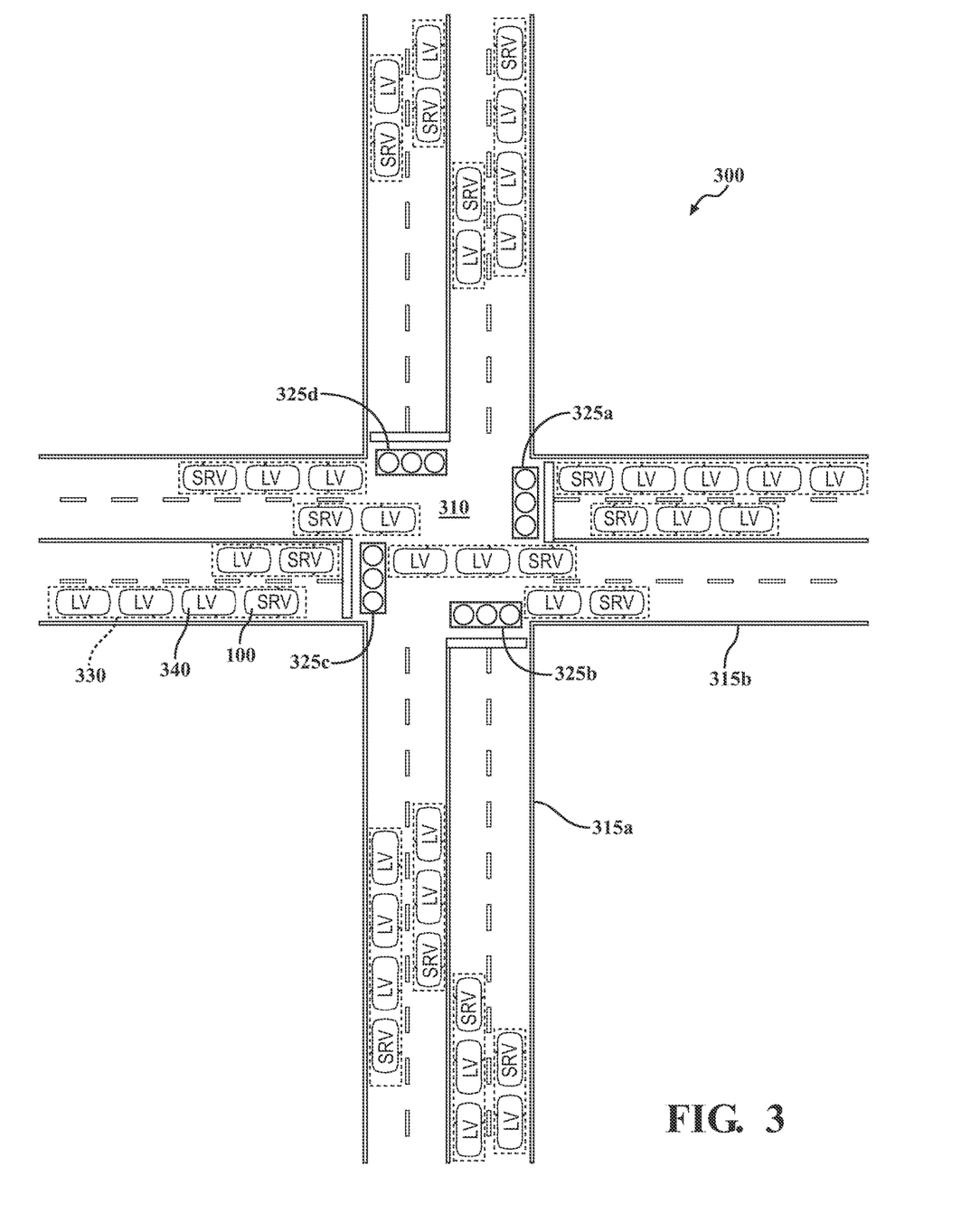
FIG. 3 illustrates a traffic environment in which the intersection management system of FIG. 2 can operate, in accordance with an illustrative embodiment of the invention.

FIG. 3 illustrates a traffic environment 300 in which the intersection management system 170 of FIG. 2 can operate, in accordance with an illustrative embodiment of the invention. FIG. 3 depicts a roadway 315a and a roadway 315b that intersect at intersection 310. Intersection 310 is regulated by traffic signals 325a-d. For clarity, not all elements in FIG. 3 have been labeled with reference numerals. Instead, one illustrative platoon 330 has been labeled. As shown in FIG. 3, platoon 330 includes an SRV 100 (the lead autonomous SRV) and three LVs 340 following the SRV 100 in the same lane of traffic. Note that platoon 330 and the other platoons depicted in FIG. 3 are enclosed within rectangular boxes that indicate the respective groupings. Platoon 330, in this example, is approaching traffic signal 325c at intersection 310.

Figure 4A:
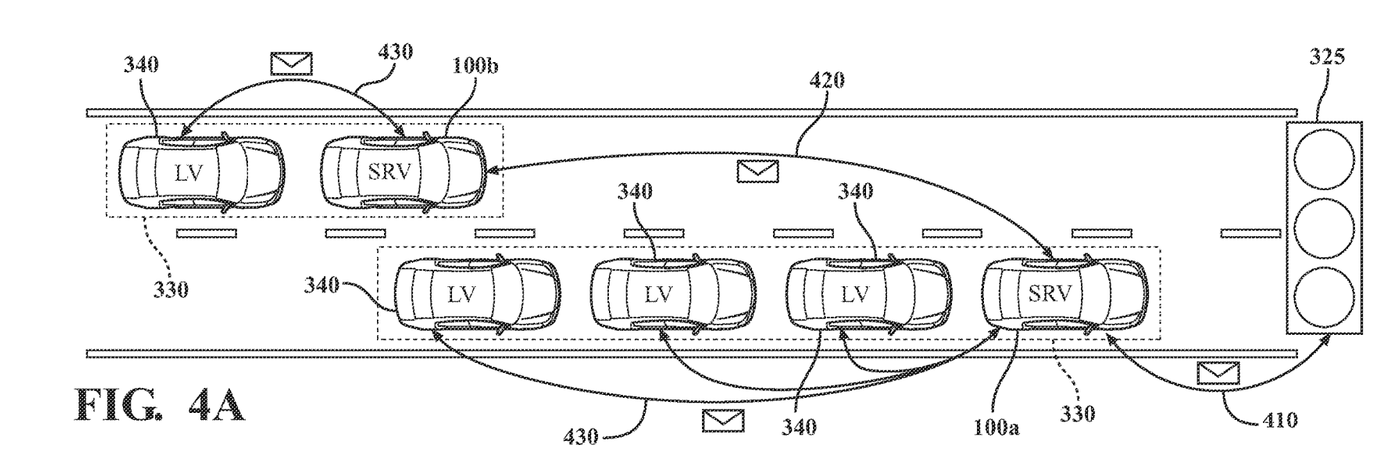
FIG. 4A illustrates vehicle-to-vehicle communications between autonomous sensor-rich vehicles in different platoons and between the lead autonomous sensor-rich vehicle in a given platoon and the other vehicles in that platoon, in accordance with an illustrative embodiment of the invention.

FIG. 4A illustrates V2V communications between autonomous SRVs in different platoons 330 and between the lead SRV 100 in a given platoon 330 and the other vehicles in that platoon 330, in accordance with an illustrative embodiment of the invention. As discussed above, one of the techniques platoon formation module 220 can use to identify following LVs that could potentially become part of a platoon 330 to be formed is to analyze information shared by other nearby SRVs. For example, in FIG. 4A, SRV 100a and SRV 100b can share with each other, via SRV-to-SRV communications 420, information about nearby LVs 340 that their respective environment sensors are able to detect. In FIG. 4A, two platoons 330 have been formed, as indicated by the enclosing rectangular boxes. As shown in FIG. 4A, SRV 100a can communicate V2V using SRV-to-LV communications 430 with the three LVs 340 in its platoon 330. The primary communication of that kind that occurs, in this embodiment, is the invitation to join the platoon 330 that SRV 100a transmits to each LV 340 and the confirmation or acceptance of that invitation that each LV 340 transmits to the inviting SRV 100a. Similar V2V communications apply to the formation of the platoon 330 led by SRV 100b in FIG. 4A.

Infrastructure communication module 230 generally includes instructions that when executed by the one or more processors 110 cause the one or more processors 110 to receive SPaT information 280 from an RSU associated with an intersection 310 toward which the platoon 330 is traveling. As discussed above, such an RSU is associated with a traffic signal 325 at an intersection 310. Referring again to FIG. 4A, a traffic signal 325 uses a SPaT message 410 to communicate SPaT information 280 to the lead SRV 100 of a platoon 330 such as SRV 100a. (The RSU associated with traffic signal 325 is not shown in FIG. 4A.) As those skilled in the art are aware, the SPaT information 280 provides the SRV 100 with the phase (green, yellow, or red) and timing (e.g., seconds remaining in a given phase) of the traffic signals 325 at the intersection 310.

Maneuver-planning module 240 generally includes instructions that when executed by the one or more processors 110 cause the one or more processors 110 to calculate, based at least in part on the SPaT information 280 and location information for the vehicles in the platoon 330, a speed profile and a trajectory for SRV 100 (the lead autonomous SRV in the platoon 330) that minimize the delay of the platoon 330 in traversing the intersection 310 while also taking into account fuel consumption (which relates directly to fuel efficiency) by the vehicles in the platoon 330. The concept of delay, in the context of the embodiments described herein, is explained further in connection with FIG. 4B.

Figure 4B:
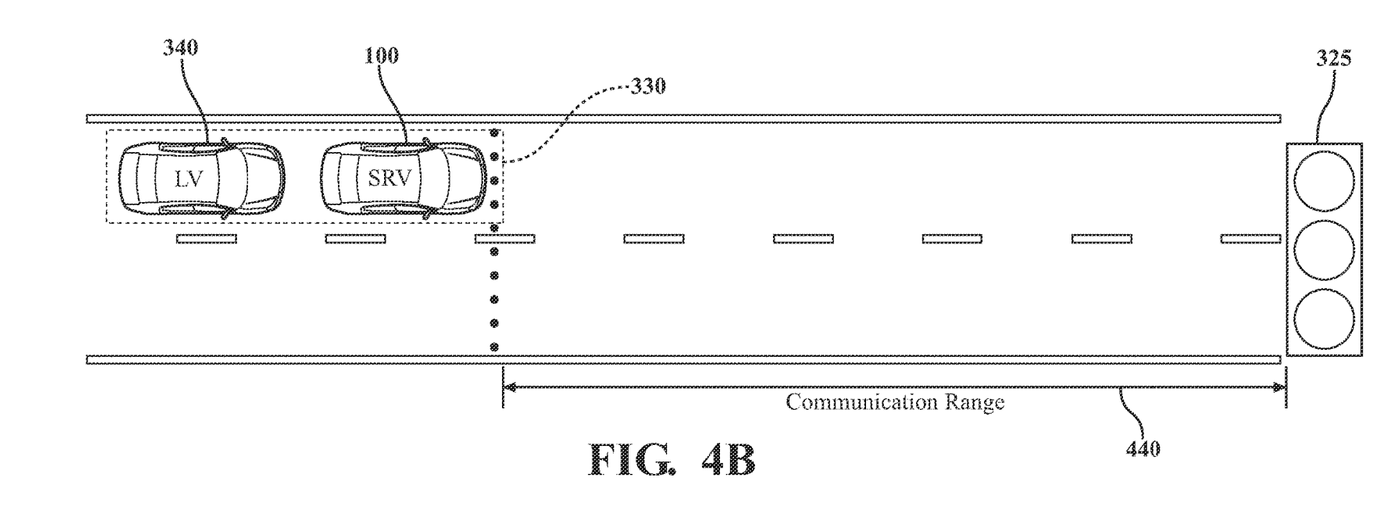
FIG. 4B illustrates a communication range of a roadside unit associated with a traffic signal, in accordance with an illustrative embodiment of the invention.

FIG. 4B illustrates a communication range 440 of a RSU associated with a traffic signal 325, in accordance with an illustrative embodiment of the invention. FIG. 4B depicts a platoon 330 made up of two vehicles, SRV 100 and LV 340, that is approaching an intersection 310 regulated by traffic signal 325 (the associated RSU is not shown in FIG. 4B). As discussed above, SRV 100, in this case, is the lead autonomous SRV in the platoon 330. The RSU associated with traffic signal 325 has a predetermined communication range 440 over which it can communicate with SRVs in the vicinity of the intersection 310. The communication range 440 can differ, depending on the particular embodiment, but, in one embodiment, communication range 440 is approximately 300 m. Given the posted speed limit and current traffic conditions, it will take the platoon 330 a minimum amount of time to travel the communication range 440. The difference between the actual time it takes the platoon 330 to traverse the intersection 310 and the minimum time to travel the communication range 440 is the "delay" associated with the platoon's traversal of the intersection 310. The goal of maneuver-planning module 240 is to minimize that delay through its calculation of a speed profile and a trajectory for the host SRV 100. A speed profile may be characterized as the speed of SRV 100 as a function of time over a relevant time horizon (e.g., the time required to traverse the intersection 310). In other words, a speed profile can include acceleration and/or deceleration. The trajectory is the path in space SRV 100 will follow to lead the platoon 330 through intersection 310 (e.g., proceeding straight or turning right or left at the intersection).

In connection with minimizing the delay a platoon 330 experiences in traversing an intersection 310, several different scenarios are possible. In one scenario, maneuver-planning module 240 produces a speed profile that causes SRV 100 to adjust its speed so that the entire platoon 330 can make it through the intersection 310 during a green phase of the traffic signal 325 by either (1) speeding up slightly to ensure that the platoon 330 makes it through the intersection 310 during a current green phase or (2) slowing down to ensure that a current red phase ends just before the platoon 330 arrives at the intersection 310, which permits the platoon 330 to proceed through the intersection during the next green phase without the platoon 330 ever having to come to a complete stop. In another scenario, maneuver-planning module 240, having determined that neither variation of the first scenario above is possible, produces a speed profile that causes SRV 100 to slow down to lead the platoon 330 to stop for a red phase before proceeding through the intersection 310. This can be done in a manner that maximizes fuel efficiency (e.g., early, gradual braking, etc.).

In some embodiments, maximizing fuel efficiency is prioritized over minimizing delay. In other embodiments, maneuver-planning module 240 balances the minimization of delay with the objective of maximizing fuel efficiency (e.g., through a weighting algorithm). In general, maneuver-planning module 240 takes fuel consumption (and, therefore, fuel efficiency) by the vehicles in the platoon 330 into account when calculating the speed profile and trajectory of the lead SRV 100 in the platoon 330.

Maneuver-planning module 240 also includes instructions that when executed by the one or more processors 110 cause the one or more processors 110 to execute the calculated speed profile and trajectory of the lead SRV 100 to control indirectly the one or more other vehicles while the platoon 330 is traversing the intersection 310. The calculated speed profile and trajectory can be carried out via autonomous driving module(s) 160, which controls vehicle systems 140 such as propulsion system 141, steering system 142, throttle system 144, and braking system 142 (refer to FIG. 1).

In some situations, a platoon 330 may include more than one SRV. In such a situation, the lead SRV 100 can share, with one or more other SRVs in the platoon 330, the computational load associated with calculating the optimum speed profile and trajectory of the lead SRV 100. As mentioned above, this is an application of a distributed-computing architecture. This sharing of computational load among the SRVs in a platoon 330 can be accomplished through V2V communication (refer to FIG. 4A, SRV-to-SRV communication 420).

In some situations in which a platoon 330 includes more than one SRV, two SRVs—the lead SRV 100 and another SRV 100 perhaps several vehicles behind the lead SRV 100—may communicate V2V with each other to negotiate splitting the platoon 330 into two separate platoons, one platoon (Platoon 1) 330 led by the original lead SRV 100 and another platoon (Platoon 2) 330 led by the other (following) SRV 100. This technique of splitting platoons 330 can be advantageous when, for example, it is possible for Platoon 1 to make it through an intersection 310 during the current green phase but not Platoon 2. In such a case, Platoon 1, led by the lead SRV 100, can adjust its speed to traverse the intersection 310 during the current green phase, and Platoon 2 can execute a fuel-efficient gradual slow-down and stop at the intersection 310 for the red phase that follows.

Figure 5:
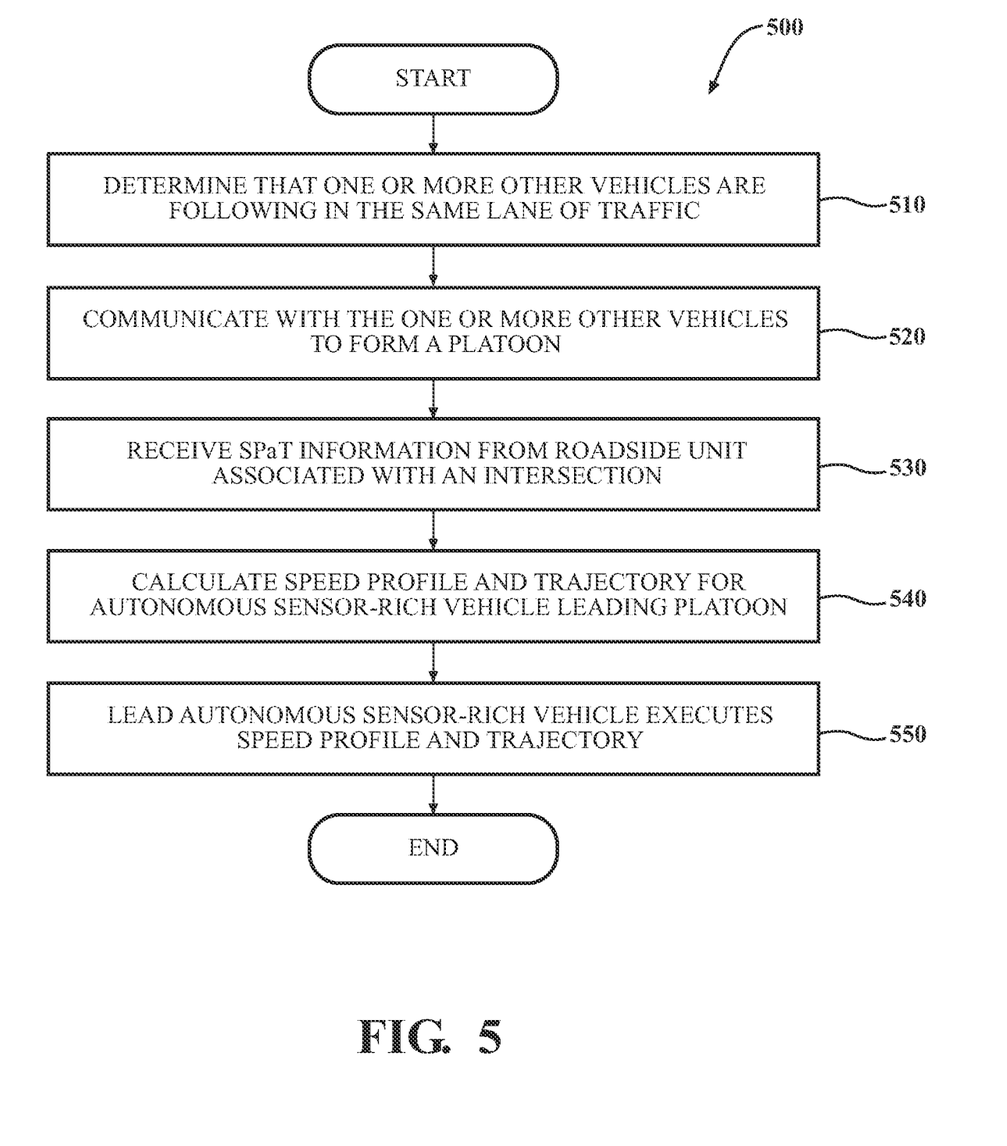
FIG. 5 is a flowchart of a method of cooperatively managing mixed traffic at an intersection, in accordance with an illustrative embodiment of the invention.

FIG. 5 is a flowchart of a method 500 of cooperatively managing mixed traffic at an intersection 310, in accordance with an illustrative embodiment of the invention. Method 500 will be discussed from the perspective of the intersection management system 170 shown in FIG. 2. While method 500 is discussed in combination with intersection management system 170, it should be appreciated that method 500 is not limited to being implemented within intersection management system 170, but intersection management system 170 is instead one example of a system that may implement method 500.

At block 510, platoon formation module 220 determines that one or more other vehicles are behind an SRV 100 in the same lane of traffic as the SRV 100, the one or more other vehicles including at least one LV 340. As discussed above, platoon formation module 220 can use one or more of several methods to make this determination: (1) platoon formation module 220 can analyze sensor data 260 obtained from one or more of the environment sensors (e.g., a rear-facing camera 126) in sensor system 120 installed on SRV 100; (2) platoon formation module 220 can analyze shared information 290 (e.g., locations and other information pertaining to nearby LVs 340) received via V2V communications from one or more other nearby SRVs; and (3) platoon formation module 220 can receive, from one or more nearby LVs 340, a V2V message (e.g., a periodically transmitted beacon message) indicating the identity and location of each of the one or more LVs 340. If platoon formation module 220 determines that a given LV 340 from which a V2V message is received is following SRV 100 in the same lane as SRV 100, that LV 340 can become a candidate for possible membership in a platoon 330 with SRV 100 as the lead vehicle, as discussed above.

At block 520, platoon formation module 220 communicates V2V from the SRV 100 with the one or more other vehicles identified at block 510 to form a platoon 330 that includes the SRV 100 and the one or more other vehicles. As discussed above, in some embodiments, SRV 100 transmits a V2V message to the one or more other vehicles inviting them to participate in a platoon 330 for the purpose of cooperatively traversing an intersection 310 toward which the vehicles in the potential platoon 330 are traveling. The one or more invited vehicles can respond to SRV 100 with a V2V message confirming their acceptance of the invitation to be part of the proposed ad hoc platoon 330. Since the embodiments described herein concern mixed-traffic situations, the one or more other vehicles joining the platoon include at least one LV 340. In general, a platoon may also include one or more other autonomous SRVs besides the lead SRV 100. In a boundary case, the lead SRV 100 may be a platoon of a single vehicle by itself.

At block 530, infrastructure communication module 230 receives SPaT information 280 from a RSU associated with the intersection 310 toward which the platoon 330 is traveling. More specifically, the RSU is associated with a traffic signal 325 at the intersection 310. As discussed above, the SPaT information 280 provides the SRV 100 with the phase (green, yellow, or red) and timing (e.g., seconds remaining in a given phase) of the traffic signals 325 at the intersection 310.

At block 540, maneuver-planning module 240 calculates, based at least in part on the SPaT information 280 and location information for the vehicles in the platoon 330, a speed profile and a trajectory for the SRV 100 that minimize the delay the platoon incurs in traversing the intersection 310 while also taking into account fuel consumption by the vehicles in the platoon. As discussed above, in some embodiments, maximizing fuel efficiency is prioritized over minimizing delay. In other embodiments, maneuver-planning module 240 balances the minimization of delay with the objective of maximizing fuel efficiency (e.g., through a weighting algorithm). In general, maneuver-planning module 240 takes fuel consumption (and, therefore, fuel efficiency) by the vehicles in the platoon 330 into account when calculating the speed profile and trajectory of the lead SRV 100. Some of the different scenarios impacting delay and fuel efficiency that can arise, depending on the current states of the traffic signals 325 at the intersection 310, are discussed above.

At block 550, maneuver-planning module 240 executes the speed profile and the trajectory for SRV 100 to control indirectly the one or more other vehicles in the platoon 330 while the platoon 330 is traversing the intersection 310. As discussed above, the calculated speed profile and trajectory can be carried out via autonomous driving module(s) 160, which controls vehicle systems 140 such as propulsion system 141, steering system 142, throttle system 144, and braking system 142 (refer to FIG. 1).

In some embodiments, method 500 includes additional actions not shown in FIG. 5. As discussed above, in some situations in which a platoon 330 includes more than one SRV, two SRVs—the lead SRV 100 and another SRV 100 perhaps several vehicles behind the lead SRV 100—may communicate V2V with each other to negotiate splitting the platoon 330 into two separate platoons, one platoon (Platoon 1) 330 led by the original lead SRV 100 and another platoon (Platoon 2) 330 led by the other (following) SRV 100. This technique of splitting platoons 330 can be advantageous when, for example, it is possible for Platoon 1 to make it through an intersection 310 during the current green phase but not Platoon 2. In such a case, Platoon 1, led by the lead SRV 100, can adjust its speed to traverse the intersection 310 during the current green phase, and Platoon 2 can execute a fuel-efficient gradual slow-down and stop at the intersection 310 for the red phase that follows.

FIG. 1 will now be discussed in full detail as an example vehicle environment within which the systems and methods disclosed herein may be implemented. The SRV 100 can include one or more processors 110. In one or more arrangements, the one or more processors 110 can be a main processor of the SRV 100. For instance, the one or more processors 110 can be an electronic control unit (ECU). The SRV 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the SRV 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, SRV 100 can receive sensor data from other connected vehicles, from devices associated with other road users (ORUs), or both.

As noted above, the SRV 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the SRV 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the SRV 100 itself, including the operational status of various vehicle components and systems.

In one or more arrangements, the vehicle sensors 121 can be configured to detect, and/or sense position and/or orientation changes of the SRV 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a navigation system 147, and/or other suitable sensors. The vehicle sensors 121 can be configured to detect, and/or sense one or more characteristics of the SRV 100. In one or more arrangements, the vehicle sensors 121 can include a speedometer to determine a current speed of the SRV 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the SRV 100 and/or information/data about such obstacles. The one or more environment sensors 122 can be configured to detect, measure, quantify, and/or sense other things in at least a portion the external environment of the SRV 100, such as, for example, nearby vehicles, lane markers, signs, traffic lights, traffic signs, lane lines, crosswalks, curbs proximate the SRV 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the SRV 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The SRV 100 can further include a communication system 130. The communication system 130 can include one or more components configured to facilitate communication between the SRV 100 and one or more communication sources. Communication sources, as used herein, refers to people or devices with which the SRV 100 can communicate with, such as external networks, computing devices, operator or occupants of the SRV 100, or others. As part of the communication system 130, the SRV 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The SRV 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The SRV 100 can include one or more vehicle systems 140. Various examples of the one or more vehicle systems 140 are shown in FIG. 1. However, the SRV 100 can include more, fewer, or different vehicle systems. It should be appreciated that although particular vehicle systems are separately defined, each or any of the systems or portions thereof may be otherwise combined or segregated via hardware and/or software within the SRV 100. The SRV 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the SRV 100. The one or more processors 110 may control some or all of these vehicle systems 140.

The SRV 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an objectoriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for cooperatively managing mixed traffic at an intersection, the system comprising:
   one or more processors in an autonomous sensor-rich vehicle; and
   a memory in the autonomous sensor-rich vehicle communicably coupled to the one or more processors and storing:
   a platoon formation module including instructions that when executed by the one or more processors cause the one or more processors to:
      determine that one or more other vehicles are behind the autonomous sensor-rich vehicle in a same lane of traffic as the autonomous sensor-rich vehicle, the one or more other vehicles including at least one legacy vehicle, wherein the at least one legacy vehicle is without cameras, Light Detection and Ranging (LIDAR) sensors, radar sensors, and sonar sensors and includes vehicle-to-vehicle communication capability and the autonomous sensor-rich vehicle receives, from the at least one legacy vehicle, a vehicle-to-vehicle message indicating an identity and location of the at least one legacy vehicle;

communicate vehicle to vehicle from the autonomous sensor-rich vehicle with the one or more other vehicles to form a platoon that includes the autonomous sensor-rich vehicle and the one or more other vehicles; and communicate, vehicle to vehicle, between the autonomous sensor-rich vehicle and another autonomous sensor-rich vehicle in the platoon to negotiate splitting the platoon into two platoons, a first platoon led by the autonomous sensor-rich vehicle and a second platoon led by the another autonomous sensor-rich vehicle;

an infrastructure communication module including instructions that when executed by the one or more processors cause the one or more processors to receive Signal Phase and Timing (SPaT) information from a roadside unit associated with an intersection toward which the first and second platoons are traveling; and a maneuver-planning module including instructions that when executed by the one or more processors cause the one or more processors to:

calculate, based at least in part on the SPaT information and location information for the first platoon, a first speed profile and a first trajectory for the autonomous sensor-rich vehicle that minimize a first delay of the first platoon in traversing the intersection while also taking into account fuel consumption by the first platoon;

calculate, based at least in part on the SPaT information and location information for the second platoon, a second speed profile and a second trajectory for the another autonomous sensor-rich vehicle that minimize a second delay of the second platoon in traversing the intersection while also taking into account fuel consumption by the second platoon; and execute the first and second speed profiles and the first and second trajectories to control indirectly the one or more other vehicles while the first and second platoons are traversing the intersection.

2. The system of claim 1, wherein the instructions in the platoon formation module to determine that the one or more other vehicles are behind the autonomous sensor-rich vehicle in the same lane of traffic as the autonomous sensor-rich vehicle include one or more of instructions to:

analyze sensor data obtained from one or more sensors installed on the autonomous sensor-rich vehicle; and analyze shared information received vehicle to vehicle from one or more other autonomous sensor-rich vehicles.

3. The system of claim 2, wherein the one or more sensors include one or more of cameras, Light Detection and Ranging (LIDAR) sensors, radar sensors, and sonar sensors.

4. The system of claim 2, wherein the shared information includes an estimated location for at least one of the one or more other vehicles.

5. The system of claim 1, wherein the maneuver-planning module includes instructions to share, among two or more autonomous sensor-rich vehicles in the first platoon, a computational load associated with calculating the first speed profile and the first trajectory.

6. The system of claim 1, wherein the first and second speed profiles include at least one of acceleration and deceleration and the first and second trajectories include one of proceeding straight through the intersection and turning at the intersection.

7. A non-transitory computer-readable medium for cooperatively managing mixed traffic at an intersection and storing instructions that when executed by one or more processors cause the one or more processors to:

determine, at an autonomous sensor-rich vehicle, that one or more other vehicles are behind the autonomous sensor-rich vehicle in a same lane of traffic as the autonomous sensor-rich vehicle, the one or more other vehicles including at least one legacy vehicle, wherein the at least one legacy vehicle is without cameras, Light Detection and Ranging (LIDAR) sensors, radar sensors, and sonar sensors and includes vehicle-to-vehicle communication capability and the autonomous sensor-rich vehicle receives, from the at least one legacy vehicle, a vehicle-to-vehicle message indicating an identity and location of the at least one legacy vehicle;

communicate vehicle to vehicle from the autonomous sensor-rich vehicle with the one or more other vehicles to form a platoon that includes the autonomous sensor-rich vehicle and the one or more other vehicles;

communicate, vehicle to vehicle, between the autonomous sensor-rich vehicle and another autonomous sensor-rich vehicle in the platoon to negotiate splitting the platoon into two platoons, a first platoon led by the autonomous sensor-rich vehicle and a second platoon led by the another autonomous sensor-rich vehicle;

receive, at the autonomous sensor-rich vehicle, Signal Phase and Timing (SPaT) information from a roadside unit associated with an intersection toward which the first and second platoons are traveling;

calculate, based at least in part on the SPaT information and location information for the first platoon, a first speed profile and a first trajectory for the autonomous sensor-rich vehicle that minimize a first delay of the first platoon in traversing the intersection while also taking into account fuel consumption by the first platoon;

calculate, based at least in part on the SPaT information and location information for the second platoon, a second speed profile and a second trajectory for the another autonomous sensor-rich vehicle that minimize a second delay of the second platoon in traversing the intersection while also taking into account fuel consumption by the second platoon; and execute the first and second speed profiles and the first and second trajectories to control indirectly the one or more other vehicles while the first and second platoons are traversing the intersection.

8. The non-transitory computer-readable medium of claim 7, wherein the instructions to determine that the one or more other vehicles are behind the autonomous sensor-rich vehicle in the same lane of traffic as the autonomous sensor-rich vehicle include one or more of instructions to:

analyze sensor data obtained from one or more sensors installed on the autonomous sensor-rich vehicle; and analyze shared information received vehicle to vehicle at the autonomous sensor-rich vehicle from one or more other autonomous sensor-rich vehicles.

9. The non-transitory computer-readable medium of claim 8, wherein the shared information includes an estimated location for at least one of the one or more other vehicles.

10. The non-transitory computer-readable medium of claim 7, wherein the instructions include instructions that when executed by the one or more processors cause the autonomous sensor-rich vehicle to share, among two or more autonomous sensor-rich vehicles in the first platoon, a computational load associated with calculating the first speed profile and the first trajectory.

11. The non-transitory computer-readable medium of claim 7, wherein the first and second speed profiles include at least one of acceleration and deceleration and the first and second trajectories include one of proceeding straight through the intersection and turning at the intersection.

12. A method of cooperatively managing mixed traffic at an intersection, the method comprising:
  determining, at an autonomous sensor-rich vehicle, that one or more other vehicles are behind the autonomous sensor-rich vehicle in a same lane of traffic as the autonomous sensor-rich vehicle, the one or more other vehicles including at least one legacy vehicle, wherein the at least one legacy vehicle is without cameras, Light Detection and Ranging (LIDAR) sensors, radar sensors, and sonar sensors and includes vehicle-to-vehicle communication capability and the autonomous sensor-rich vehicle receives, from the at least one legacy vehicle, a vehicle-to-vehicle message indicating an identity and location of the at least one legacy vehicle;
  communicating vehicle to vehicle from the autonomous sensor-rich vehicle with the one or more other vehicles to form a platoon that includes the autonomous sensor-rich vehicle and the one or more other vehicles;
  communicating, vehicle to vehicle, between the autonomous sensor-rich vehicle and another autonomous sensor-rich vehicle in the platoon to negotiate splitting the platoon into two platoons, a first platoon led by the autonomous sensor-rich vehicle and a second platoon led by the another autonomous sensor-rich vehicle;
  receiving, at the autonomous sensor-rich vehicle, Signal Phase and Timing (SPaT) information from a roadside unit associated with an intersection toward which the first and second platoons are traveling;
  calculating at the autonomous sensor-rich vehicle, based at least in part on the SPaT information and location information for the first platoon, a first speed profile and a first trajectory for the autonomous sensor-rich vehicle that minimize a first delay of the first platoon in traversing the intersection while also taking into account fuel consumption by the first platoon;
  calculating, based at least in part on the SPaT information and location information for the second platoon, a second speed profile and a second trajectory for the another autonomous sensor-rich vehicle that minimize a second delay of the second platoon in traversing the intersection while also taking into account fuel consumption by the second platoon; and
  executing the first and second speed profiles and the first and second trajectories to control indirectly the one or more other vehicles while the first and second platoons are traversing the intersection.

13. The method of claim 12, wherein the determining, at the autonomous sensor-rich vehicle, that the one or more other vehicles are behind the autonomous sensor-rich vehicle in the same lane of traffic as the autonomous sensor-rich vehicle includes one or more of:
  analyzing sensor data obtained from sensors installed on the autonomous sensor-rich vehicle; and
  analyzing shared information received vehicle to vehicle at the autonomous sensor-rich vehicle from one or more other autonomous sensor-rich vehicles.

14. The method of claim 13, wherein the shared information includes an estimated location for at least one of the one or more other vehicles.

15. The method of claim 12, wherein the autonomous sensor-rich vehicle shares, among two or more autonomous sensor-rich vehicles in the first platoon, a computational load associated with calculating the first speed profile and the first trajectory.

16. The method of claim 12, wherein the first and second speed profiles include at least one of acceleration and deceleration and the first and second trajectories include one of proceeding straight through the intersection and turning at the intersection.

17. The method of claim 12, wherein the autonomous sensor-rich vehicle is equipped with one or more of cameras, Light Detection and Ranging (LIDAR) sensors, radar sensors, and sonar sensors.

* * * * *